(12) United States Patent
Sumesaglam et al.

(10) Patent No.: US 7,979,039 B2
(45) Date of Patent: Jul. 12, 2011

(54) PRE-DISTORTING A TRANSMITTED SIGNAL FOR OFFSET CANCELLATION

(75) Inventors: Taner Sumesaglam, Folsom, CA (US); Aaron Martin, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 11/903,652

(22) Filed: Sep. 24, 2007

(65) Prior Publication Data
US 2009/0079484 A1 Mar. 26, 2009

(51) Int. Cl.
H01F 27/42 (2006.01)
H01Q 11/12 (2006.01)
(52) U.S. Cl. ......... 455/126; 326/62; 307/412; 713/300
(58) Field of Classification Search .............. 455/126; 326/62–92; 713/300; 307/412
See application file for complete search history.

(56) References Cited

U.S. PATENT DOCUMENTS

| | | | | |
|---|---|---|---|---|
| 4,359,779 A * | 11/1982 | Levine | ........................... | 455/110 |
| 4,992,753 A * | 2/1991 | Jenson et al. | ................... | 330/129 |
| 5,438,683 A * | 8/1995 | Durtler et al. | .................... | 455/74 |
| 5,465,399 A * | 11/1995 | Oberholtzer et al. | ........... | 455/69 |
| 5,566,363 A * | 10/1996 | Senda | ........................... | 455/126 |
| 5,590,418 A * | 12/1996 | Holoubek et al. | ............. | 455/126 |
| 5,634,195 A * | 5/1997 | Sawyer | ........................ | 455/522 |
| 5,940,429 A * | 8/1999 | Lam et al. | ...................... | 375/130 |
| 6,020,787 A * | 2/2000 | Kim et al. | ...................... | 330/279 |
| 6,041,081 A * | 3/2000 | O et al. | ........................... | 375/297 |
| 6,084,868 A * | 7/2000 | Piirainen | ........................ | 370/345 |
| 6,169,907 B1 * | 1/2001 | Chang et al. | .................. | 455/522 |
| 6,243,426 B1 * | 6/2001 | Lo et al. | ......................... | 375/289 |
| 6,256,482 B1 * | 7/2001 | Raab | ............................. | 455/108 |
| 6,366,128 B1 * | 4/2002 | Ghia et al. | ....................... | 326/83 |
| 6,490,460 B1 * | 12/2002 | Soliman | ......................... | 455/522 |
| 6,507,225 B2 | 1/2003 | Martin et al. | .................. | 327/108 |
| 6,563,891 B1 * | 5/2003 | Eriksson et al. | .............. | 375/345 |
| 7,079,818 B2 * | 7/2006 | Khorram | .................... | 455/115.1 |
| 7,138,863 B2 * | 11/2006 | Persson | ......................... | 330/129 |
| 7,233,165 B2 * | 6/2007 | Jordy | ............................. | 326/29 |
| 7,532,034 B2 * | 5/2009 | Ker et al. | ......................... | 326/81 |
| 7,548,094 B2 * | 6/2009 | Shepard et al. | ................. | 326/82 |
| 7,629,880 B2 * | 12/2009 | Stilp et al. | ..................... | 340/508 |
| 2002/0193078 A1 * | 12/2002 | MacFarlane Shearer et al. | ............................. | 455/69 |
| 2007/0072568 A1 | 3/2007 | Sumesaglam et al. | ........ | 455/230 |

FOREIGN PATENT DOCUMENTS
WO WO 03056715 A1 * 7/2003

OTHER PUBLICATIONS
U.S. Appl. No. 11/510,959, filed Aug. 28, 2006, entitled "Circuit Synchronize The Phase Of A Distributed Clock Signal With A Received Clock Signal," by Taner Sumesaglam, et al.

* cited by examiner

Primary Examiner — Paul R Myers
(74) Attorney, Agent, or Firm — Trop, Pruner & Hu, P.C.

(57) ABSTRACT

In one embodiment, the present invention includes a pre-driver to receive data of a first clock phase and to pre-drive the data, a driver coupled to the pre-driver to drive the data onto a link operable to be coupled to a receiver, and an offset driver to drive an offset value associated with the first clock phase onto the link with the data. Other embodiments are described and claimed.

17 Claims, 4 Drawing Sheets

US 7,979,039 B2

PRE-DISTORTING A TRANSMITTED SIGNAL FOR OFFSET CANCELLATION

BACKGROUND

In computer systems, many different components communicate with each other. Typically, various semiconductor devices that may be coupled on a motherboard or other circuit board may communicate along traces on the board, such as various bus lines. Furthermore, other signaling occurs between components in a first system and a second system using various input/output (I/O) circuitry. In communicating data between different devices, an offset can occur due to various conditions.

The undesired offset in receivers can be as high as ±50 millivolts (mV) depending on the transistor sizing, layout, and process mismatch coefficients. This offset degrades the voltage sensitivity of the receivers; therefore, offset cancellation techniques are often employed on the receiver circuits. A conventional approach is to use a voltage offset comparator (VOC) as the first stage in receivers and followed by a sampler. Analog VOC circuits can consume substantial current in order to accommodate the bandwidth requirements. Moreover, in multi-phase clocking input/outputs (I/Os), samplers are interleaved and each of them requires a VOC. Consequently, power consumption and logic complexity becomes prohibitive.

DETAILED DESCRIPTION

In various embodiments, an offset correction circuit and technique can be used in data communication circuitry. For example, such offset techniques can be applied to multi-phase clocking I/Os, where the offsets that relate to receiver circuitry are determined during link training and embedded to the data signal with an offset driver during normal operation on the transmitting side.

Figure 1:
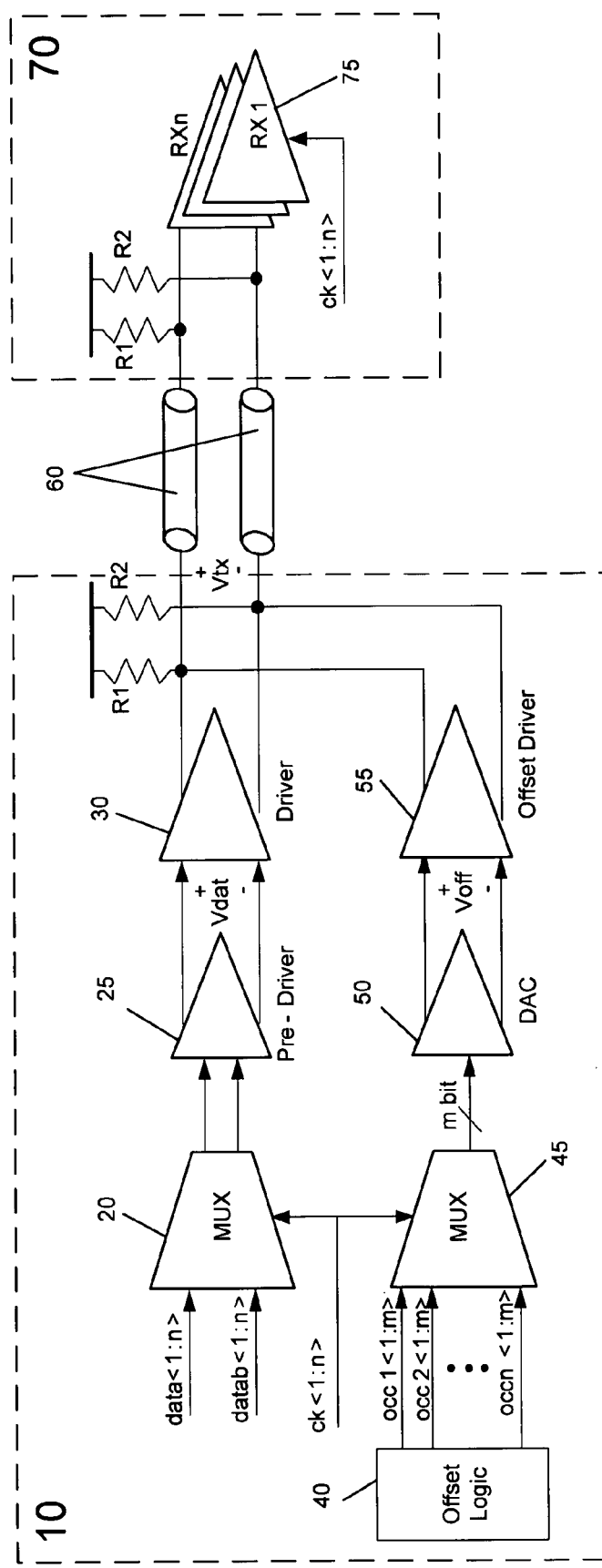
FIG. 1 is a block diagram of a system in accordance with one embodiment of the present invention.

Embodiments thus achieve offset correction from the transmitting chip. One possible implementation is shown in FIG. 1. Referring now to FIG. 1, shown is a block diagram of a system in accordance with one embodiment of the present invention. As shown in FIG. 1, a system may include multiple devices such as multiple semiconductor chips, including, for example, a first device 10 which is referred to herein as a transmitter 10. In various embodiments, transmitter 10 may correspond to a chipset component, such as a memory controller or other such interface, although the scope of the present invention is not limited in this regard. As shown in FIG. 1, transmitter 10 is coupled through a link 60 to a second device 70, which may be a second semiconductor device, referred to herein as a receiver 70. In some embodiments, receiver 70 may correspond to a memory such as a dynamic random access memory (DRAM) although the scope of the present invention is not limited in this regard. Link 60 may correspond to a given channel which may be a point-to-point link, bus or other such interconnect. In some embodiments, link 60 may be a differential link.

Transmitter 10 may include various circuitry, including circuitry to provide an offset to data transmitted along link 60. Specifically, a data path of transmitter 10 includes a multiplexer 20 or other selection logic which is coupled to receive data, namely "data[1:n]" and "datab[1:n]", which may be differential values of the data. Based on a given phase of a multi-phase clock "ck[1:n]", multiplexer 20 selects data, which may be a single data bit, for output. In turn, the output of multiplexer 20 is coupled to a pre-driver 25, which pre-drives the data to a voltage level of ±Vdat, which in turn is provided to a driver 30, which in turn drives the data to a transmission level of ±Vtx. Note that driver 30 and pre-driver 25 may be voltage drivers to generate a differential voltage. Note that also coupled to the outputs of transmitter 10 are a pair of on-die terminations, i.e., resistors R1 and R2, which may be 50 ohm resistances, in one embodiment. Also coupled to the outputs is an offset value ±Voff.

The offset value may be generated using offset logic 40, which may provide various offset correction codes occ1[1:m]-occn [1:m] to a multiplexer 45 or other selection logic. Multiplexer 45 is similarly controlled by a given phase of the clock signal to provide an m-bit output, which in turn is provided to a digital-to-analog converter (DAC) 50 which converts the digital value to an analog voltage, ±Voff, which is then driven by an offset driver 55 which may also be a voltage driver, and coupled onto the output of transmitter 10. Thus the combined output provided to link 60 includes both data for a given clock phase, as well as a corresponding offset value.

Thus, transmitter 10 sends data to receiver 70 through a channel including link 60, employing multi-phase clocks (ck<1:n>). Therefore, interleaved receivers 75 are present in receiver 70 to capture the data with a corresponding clock phase. In each receiver 75 (RXi for i=1 . . . n), there is some offset due to the mismatch in the transistors, terminations, and traces in the signal path from the transmitter to the receiver output. The amount of each offset is determined in the link training, and stored in registers in offset logic 40.

In one embodiment during training mode the inputs to pre-driver 25 are shorted while an offset correction code (OCC) code is gradually increased to detect a predetermined density of logical 1 at the receiver output (50%, for example). Once detected, the corresponding code is stored in the OCC registers. Details of training are described further below. In normal operation, the registers drive DAC 50 which is controlled by clock phase, i.e., if sending phase-i data, the offset associated with the path to RXi is sent together with the data (i=1 . . . n).

Figure 2:
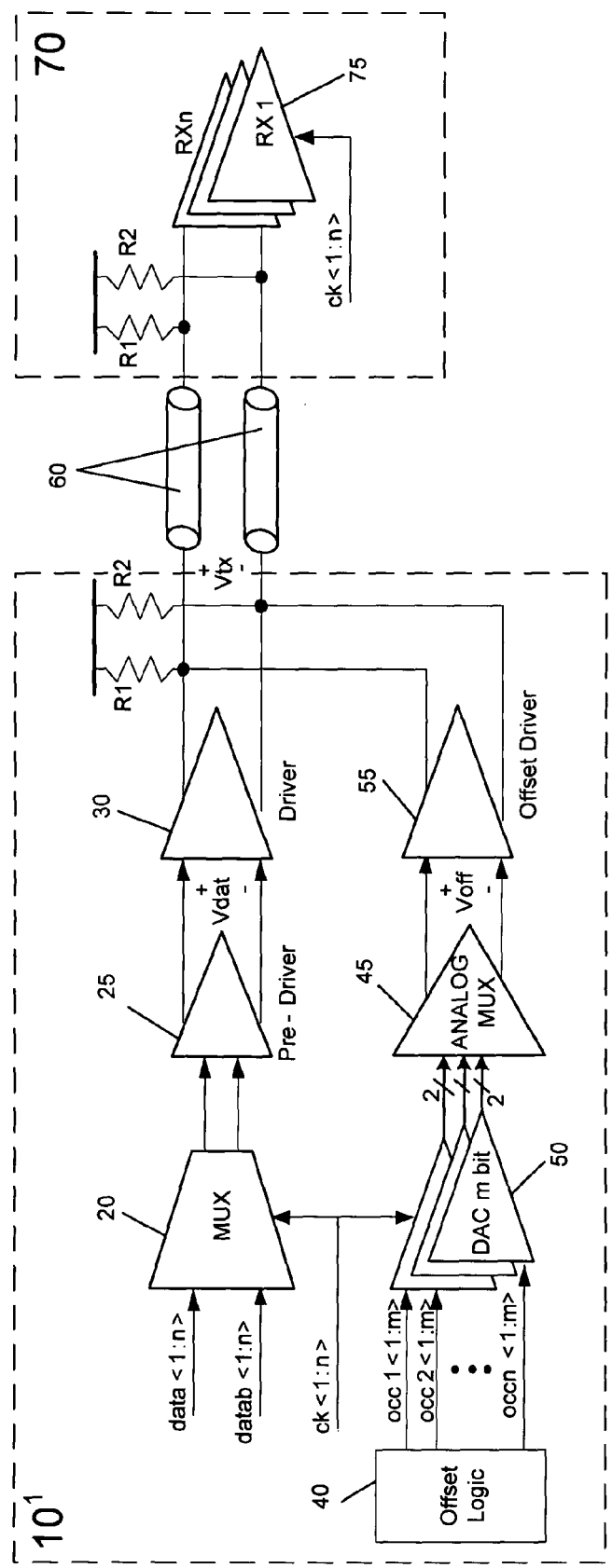
FIG. 2 is a block diagram of a system in accordance with another embodiment of the present invention.

FIG. 2 shows another implementation with a transmitter 10 in which multiple DAC circuits 50 are employed to reduce the speed requirements on the DAC design. Note that in various embodiments of DAC resolution, m, is low, such as 3-5 bits, although the scope of the present invention is not limited in this regard.

Figure 3:
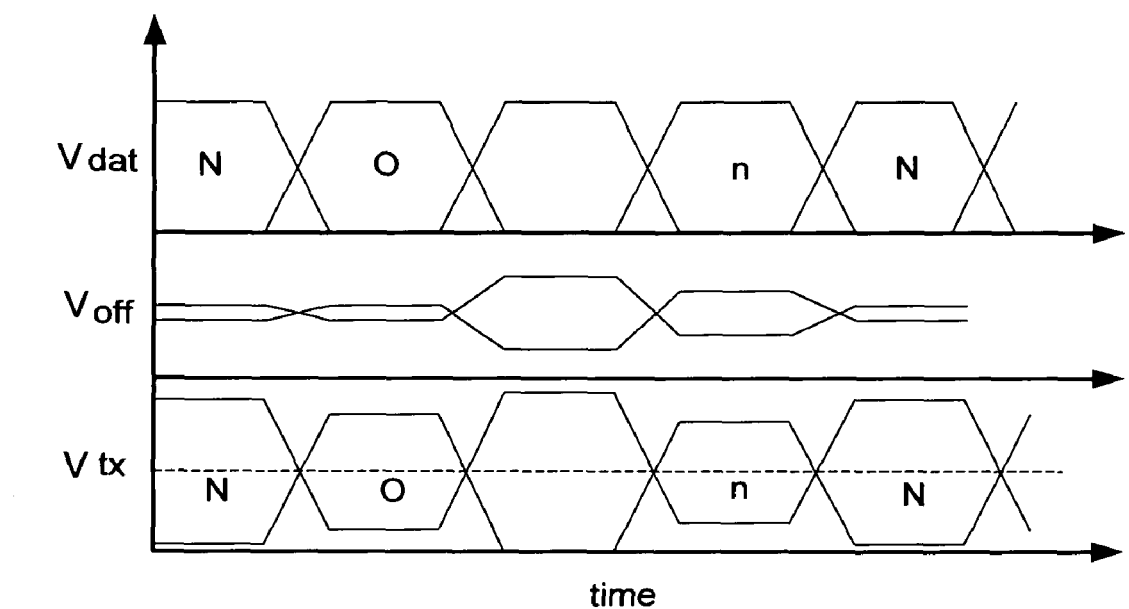
FIG. 3 is a timing diagram in accordance with one embodiment of the present invention.

Signal waveforms are shown in FIG. 3. The waveforms, which show each of multiple clock phases 1-n, are exaggerated for clarity. Vdat is the differential output signal of pre-driver 25. It has a fixed common mode and signal swing. DAC circuit 50 generates a differential voltage value swing of Voff that is determined by OCC registers in offset logic 40. Offset driver 55 drives a different amount of current depending on the differential voltage applied to its input (Voff). The overall effect on the signal at the pad (Vtx) (i.e., the output of transmitter 10) is shown in FIG. 3. The common mode represented by the dashed line in Vtx remains the same while the signal swing varies with the applied differential offset. This embedded offset will cancel out the inherent offset in the path and the receiver 70. As shown in FIG. 3, note that these different offsets may vary per phase in some embodiments. As shown in FIG. 3 in normal operation, the amplitude of the signal transmitted will change (e.g., per phase) and be periodic. Also, during link initialization, the signal amplitude will increase/decrease gradually, indicating that calibration is occurring.

Figure 4:
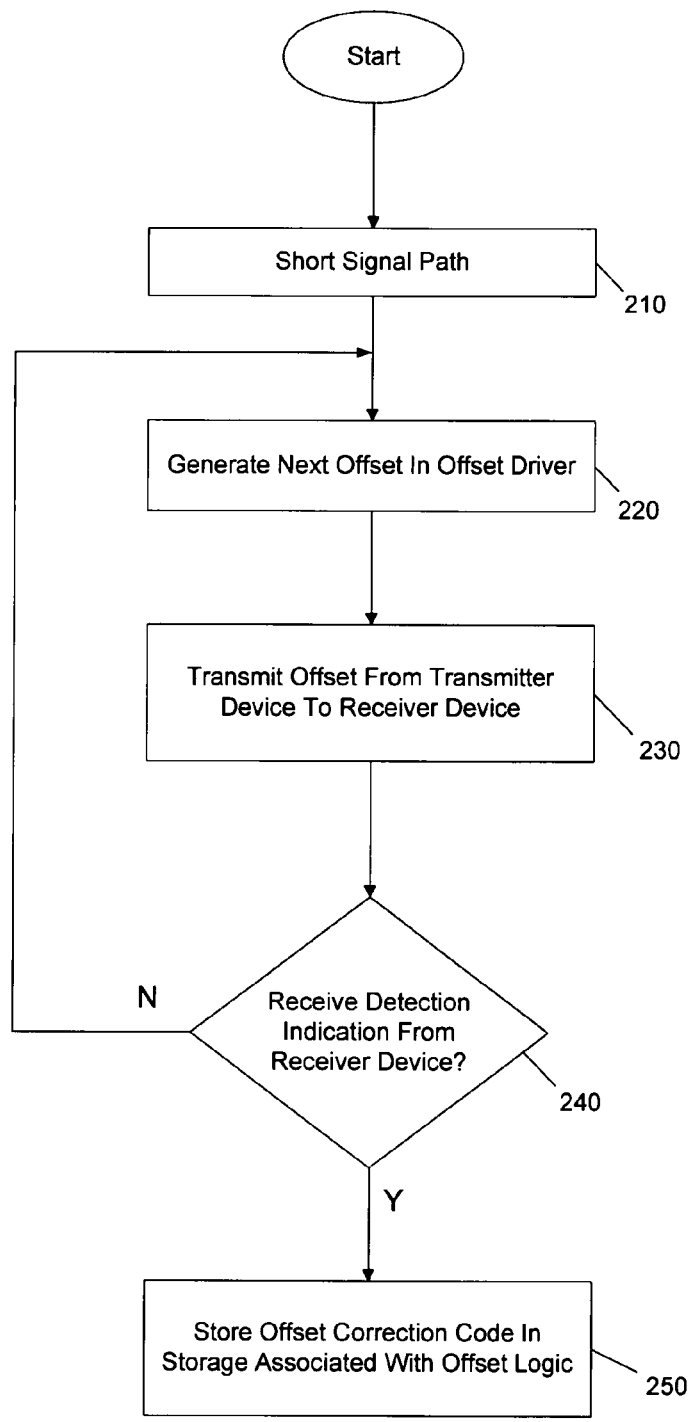
FIG. 4 is a flow diagram of a method in accordance with one embodiment of the present invention.

Referring now to FIG. 4, shown is a flow diagram of a method in accordance with one embodiment of the present invention. Method 200 shown in FIG. 4 may be used to perform a training interval or sequence to generate an offset correction code for a given phase of a multi-clock phase. As shown in FIG. 4, method 200 may begin by shorting a signal path in the transmitter (block 210). Thus no data is output from a driver of the transmitter during this portion of a training phase. At the same time, a next offset may be generated in an offset driver (block 220). In various embodiments, this offset may be generated based on an OCC generated in offset logic. During ensuing iterations of block 220, this OCC may be gradually increased/decreased, as will be described below. As an example, the OCC may begin at logic 0 at a first interval for a given phase and increase by a predetermined amount (e.g., logic one) for each iteration until a final code is determined, which may take approximately 5-15 iterations, in some embodiments. Then control passes to block 230, where the offset may be transmitted from the transmitter device to the receiver device, e.g., along a given link channel.

Referring still to FIG. 4, next it may be determined whether a detection indication has been received from the receiver device (diamond 240). For example, the transmitter device may receive this detection indication when the receiver detects a predetermined density of a given data value (e.g., logic 1) at an output of a receiver within the receiver device. While the scope of the present invention is not limited in this regard, in some embodiments the predetermined density may be approximately 50%. If the detection indication is not received, control passes back to block 220, where on a next corresponding phase a different offset amount (e.g., gradually increasing amount) may be transmitted again. Thus blocks 220, 230 and 240 may be iteratively performed until the detection indication is received. When this indication is received, control passes to block 250 where the offset correction code may be stored in a storage associated with offset logic. For example, the offset logic may include multiple registers, each register associated with a given phase of the multi-phase clock. In this way, the register associated with the clock phase (and corresponding receiver) described in FIG. 4 may be stored. Note that the method of FIG. 4 may be performed for each phase of the multi-phase clock such that each register in the offset logic is provided with an OCC for the corresponding receiver.

Embodiments thus remove the logic burden and complexity from the receiving chip, such as a DRAM, as instead the transmit signal is predistorted on the transmitting chip to cancel out the offset in the link, driver and receiver. This stands in contrast to offset cancellation on the receiving chip through VOC circuits. As a VOC is a common mode logic (CML) circuit which constantly draws current from supply, and each interleaved receiver requires a VOC as the first stage, embodiments can save substantial area and power consumption on a receiving device.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
generating an offset for a first clock phase of a multi-phase clock during a training interval in an offset driver, wherein the offset is varied during at least some iterations of the first clock phase, wherein a data bit of an n-bit data is to be selected at the first clock phase;
transmitting the offset from a first device including the offset driver to a second device along a link;
receiving an indication in the first device that a signal corresponding to the offset has been detected in the second device with a predetermined density of a first logic level; and
storing an offset code in an offset register of the first device corresponding to the offset when the indication is received, the offset to correct an offset present in an interleaved receiver of the second device corresponding to the first clock phase.

2. The method of claim 1, further comprising shorting a pre-driver coupled to a driver of a signal path during the training interval.

3. The method of claim 2, further comprising generating and transmitting the offset, receiving the indication and storing the offset code for each of a plurality of clock phases of the multi-phase clock, wherein at each of the plurality of clock phases a different data bit of the n-bit data is to be selected.

4. The method of claim 2, further comprising generating a data value in the signal path, combining the data value with an offset value generated by the stored offset code, and providing the combined data value and offset value from the first device to the second device during normal operation.

5. The method of claim 1, further comprising predistorting a data value with the stored offset code to condition the data value for distortion in the link.

6. The method of claim 5, further comprising recovering the data value in the second device without performing offset correction in the second device.

7. The method of claim 6, wherein the first device includes a memory controller, and the second device includes a memory coupled to the memory controller.

8. An apparatus comprising:
a pre-driver to receive data based on a first clock phase of a multi-phase clock and to pre-drive the data;
a driver coupled to the pre-driver to drive the data onto a link operable to be coupled to a receiver; and
an offset driver to drive an offset value associated with the first clock phase onto the link with the data, wherein the offset value is to correct an offset present in an interleaved receiver of the receiver corresponding to the first clock phase.

9. The apparatus of claim 8, further comprising selection logic to receive data of a plurality of clock phases and to output the data of the first clock phase to the pre-driver, wherein the selection logic is controlled by the plurality of clock phases.

10. The apparatus of claim 9, further comprising:
offset logic coupled to the offset driver to provide an offset correction code to the offset driver, wherein the offset value is generated in the offset driver based on the offset correction code;
second selection logic coupled to the offset logic to select one of a plurality of offset correction codes to output to the offset driver based on the first clock phase; and
a digital-to-analog converter to receive the offset correction code from the second selection logic and to output the offset value to the offset driver.

11. The apparatus of claim 10, wherein the offset logic is operable to provide a plurality of varying values for the first clock phase during a training interval to generate the offset correction code.

12. The apparatus of claim 11, wherein the offset logic is operable to select one of the plurality of varying values to be the offset correction code when the receiver has detected the offset value with a predetermined density of a first logic level and to store the offset correction code in a storage.

13. The apparatus of claim 9, further comprising:
offset logic coupled to the offset driver to provide a plurality of offset correction codes, wherein the offset value is generated in the offset driver based on one of the offset correction codes;
a plurality of digital-to-analog converters to each receive one of the offset correction codes and to output an analog correction code; and
second selection logic coupled to the digital-to-analog converters to select one of the analog correction codes to output to the offset driver based on a given one of the plurality of clock phases.

14. The apparatus of claim 13, wherein the offset logic is operable to provide a plurality of varying values during a training interval to generate each of the plurality of offset correction codes and to select one of the plurality of varying values to be the offset correction code when the receiver has detected the offset value with a predetermined density of a first logic level and to store the offset correction code in a storage.

15. A system comprising:
a first device including:
a pre-driver to receive a datum of a multi-bit data based on a corresponding clock phase of a multi-phase clock and to pre-drive the datum, a driver coupled to the pre-driver to drive the datum onto a link, and an offset driver to drive an offset value associated with the corresponding clock phase onto the link with the datum; and
a second device coupled to the first device via the link, the second device including:
a plurality of interleaved receivers each to capture the datum and the offset value for one of the corresponding clock phases of the multi-phase clock, wherein the offset value is to correct an offset present in the interleaved receiver of the corresponding clock phase.

16. The system of claim 15, wherein the first device is to generate an offset for a first clock phase of the multi-phase clock during a training interval in the offset driver, the offset varied during at least some iterations of the first clock phase, transmit the offset from the first device along the link, receive an indication in the first device that a signal corresponding to the offset has been detected in the second device with a predetermined density of a first logic level, and store an offset code in an offset register of the first device corresponding to the offset when the indication is received.

17. The system of claim 16, wherein the first device is to short the pre-driver coupled to the driver of a signal path during the training interval.

* * * * *